United States Patent
Dietzel et al.

(10) Patent No.: US 8,749,522 B2
(45) Date of Patent: Jun. 10, 2014

(54) OPTICAL SENSOR FOR MEASURING A FORCE DISTRIBUTION

(75) Inventors: Andreas Heinrich Dietzel, Kempen (DE); Harmannus Franciscus Maria Schoo, Eersel (NL); Marinus Marc Koetse, Eindhoven (NL)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 729 days.

(21) Appl. No.: 12/676,621

(22) PCT Filed: Sep. 9, 2008

(86) PCT No.: PCT/NL2008/050594
§ 371 (c)(1),
(2), (4) Date: Apr. 6, 2010

(87) PCT Pub. No.: WO2009/035324
PCT Pub. Date: Mar. 19, 2009

(65) Prior Publication Data
US 2010/0253650 A1 Oct. 7, 2010

(30) Foreign Application Priority Data
Sep. 10, 2007 (EP) .................................. 07116050

(51) Int. Cl.
*G06F 3/042* (2006.01)
*G01L 1/24* (2006.01)

(52) U.S. Cl.
USPC .............................. 345/175; 345/176; 73/800

(58) Field of Classification Search
CPC ....... G06F 3/041; G06F 3/042; G06F 3/0421; G06F 3/0428; G06F 3/0304; G01L 1/241; G01L 1/247

USPC ................. 345/84, 157–177, 469; 178/18.01; 250/221, 208.1, 227.14; 324/96, 105, 324/109; 73/800
See application file for complete search history.

(56) References Cited

U.S. PATENT DOCUMENTS 4,405,197 A 9/1983 Bejczy
4,531,138 A * 7/1985 Endo et al. ...................... 347/51
(Continued)

FOREIGN PATENT DOCUMENTS

EP 1467224 A1 10/2004
GB 2315594 A 2/1998
(Continued)

OTHER PUBLICATIONS

Rossiter, "A Novel Tactile Sensor Using a Matrix of LEDs Operating in Both Photoemitter and Photodetector Modes", Oct. 31, 2005, pp. 994-997, Piscataway, NJ, USA.

(Continued)

*Primary Examiner* — Prabodh M Dharia
(74) *Attorney, Agent, or Firm* — Fleit Gibbons Gutman Bongini & Bianco PL; Martin Fleit; Paul D. Bianco

(57) ABSTRACT

An optical sensor for measuring a force distribution includes a substrate, one or more light emitting sources, and one or more detectors provided on the substrate, with the detectors responsive to the light emitted by the sources. A deformable opto-mechanical layer is also provided on the substrate with light responsive properties depending on a deformation of the opto-mechanical layer. The design of the sensor and particularly the use of optical components in a deformable layer make it possible to measure the contact force accurately, including in some embodiments, the direction of the contact force. The sensor is scalable and adaptable to complex shapes.

14 Claims, 6 Drawing Sheets

(56) References Cited

U.S. PATENT DOCUMENTS

| | | | |
|---|---|---|---|
| 4,547,729 A * | 10/1985 | Adolfsson et al. | 324/96 |
| 4,678,902 A * | 7/1987 | Perlin | 250/227.21 |
| 5,012,679 A * | 5/1991 | Haefner | 73/800 |
| 5,044,736 A | 9/1991 | Jaskie et al. | |
| 5,445,011 A * | 8/1995 | Ghislain et al. | 73/105 |
| 5,633,947 A * | 5/1997 | Sibbald | 382/124 |
| 6,023,064 A | 2/2000 | Burgin | |
| 6,267,014 B1 * | 7/2001 | Gagnon | 73/862.046 |
| 6,774,354 B2 * | 8/2004 | Ames | 250/227.14 |
| 6,788,295 B1 * | 9/2004 | Inkster | 345/175 |
| 7,339,738 B1 * | 3/2008 | Carr et al. | 359/569 |
| 7,512,298 B2 * | 3/2009 | Yi et al. | 385/39 |
| 7,652,767 B2 * | 1/2010 | Harsh et al. | 356/445 |
| 7,723,120 B2 * | 5/2010 | Xiao et al. | 436/164 |
| 7,859,519 B2 | 12/2010 | Tulbert | |
| 8,336,399 B2 * | 12/2012 | Muroyama et al. | 73/862.046 |
| 8,448,530 B2 * | 5/2013 | Leuenberger et al. | 73/862.625 |
| 2002/0017141 A1 * | 2/2002 | Satoh | 73/655 |
| 2002/0130832 A1 * | 9/2002 | Baucom et al. | 345/107 |
| 2003/0015043 A1 | 1/2003 | Okada | |
| 2003/0137494 A1 | 7/2003 | Tulbert | |
| 2003/0150714 A1 * | 8/2003 | Cropper et al. | 204/192.29 |
| 2003/0173708 A1 * | 9/2003 | Paritsky et al. | 264/272.16 |
| 2004/0212603 A1 * | 10/2004 | Cok | 345/175 |
| 2005/0073507 A1 * | 4/2005 | Richter et al. | 345/174 |
| 2005/0232532 A1 * | 10/2005 | Wang et al. | 385/13 |
| 2006/0197737 A1 * | 9/2006 | Baucom et al. | 345/107 |
| 2007/0043508 A1 * | 2/2007 | Mizota et al. | 702/19 |
| 2007/0242269 A1 * | 10/2007 | Trainer | 356/336 |
| 2010/0283756 A1 * | 11/2010 | Ku et al. | 345/174 |
| 2011/0214094 A1 | 9/2011 | Tulbert | |
| 2012/0235935 A1 * | 9/2012 | Ciesla et al. | 345/173 |
| 2013/0265280 A1 * | 10/2013 | Burns et al. | 345/174 |

FOREIGN PATENT DOCUMENTS

| | | |
|---|---|---|
| JP | 60168028 | 8/1985 |
| JP | 01006836 | 1/1989 |
| JP | 2003532216 A | 10/2003 |
| JP | 200771564 A | 10/2008 |
| JP | 2008230651 A | 10/2008 |
| WO | 9913306 | 3/1999 |
| WO | 0184251 A2 | 11/2001 |

OTHER PUBLICATIONS

Burgi et al, "Optical proximity and touch sensors based on monolithically integrated polymer photodiodes and polymer LEDs", Apr. 2006, 7-2, vol. 7, No. 2, pp. 114-120Apr. 2006, Organic Electronics, Elsevier, Amsterdam.

Ghosh A et al, "Thin-film encapsulation of organic light-emitting devices", May 24, 2005, pp. 223503-223503, American Institute of Physics, Melville, NY, USA.

Chen J et al, "Towars modular integrated sensors: the development of artificial haircell sensors using efficient fabrication methods", Oct. 27. 2003, pp. 2341-23, International Conference on Intelligent Robots and Systems, New York, NY.

Loetters JC et al, "The Mechanical Properties of the Rubber Elastic Polymer Polydimethylsiloxane for Sensor Application", vol. 7, No. 3, Apr. 9, 1997, pp. 145-147, Journal of Micromechanics & Microengineering, Institute of Physics Publishing, Bristol, GB.

Chase T A et at, "A thin-film flexible capacitive tactile normal/shear force array sensor", Nov. 6, 1995, pp. 1196-1201, New York, NY, USA.

International Search Report published Mar. 19, 2009 for PCT/NL2008/50594, filed Sep. 9, 2008.

International Preliminary Report on Patentability Chapter 1 published Mar. 16, 2010 for PCT/NL2008/50594, filed Sep. 9, 2008.

Written Opinion of the International Search Authority published Mar. 20, 2010 for PCT/NL2008/50594, filed Sep. 9, 2008.

English translation of Office Action dated Jan. 22, 2013 for Patent Application No. 2010-524798, pp. 1-7.

* cited by examiner

Figure 1
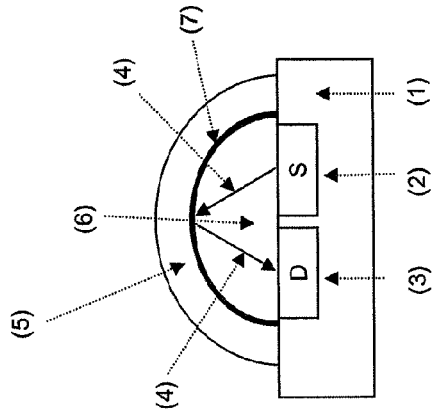
Figure 1B
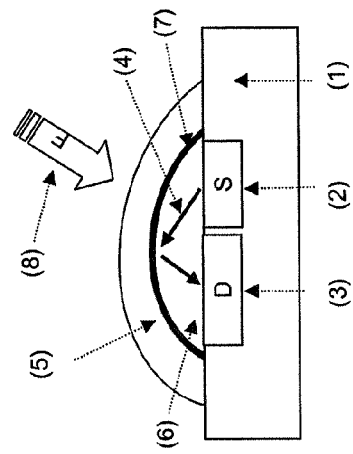
Figure 1C
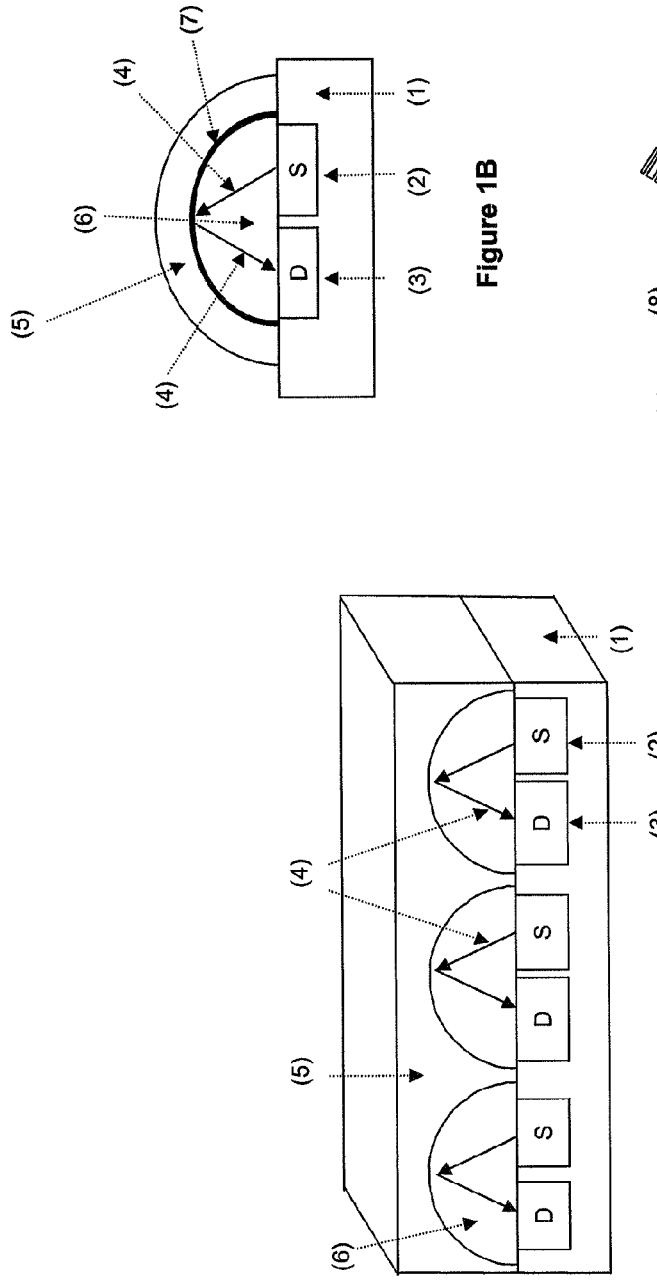
Figure 1A

Figure 2
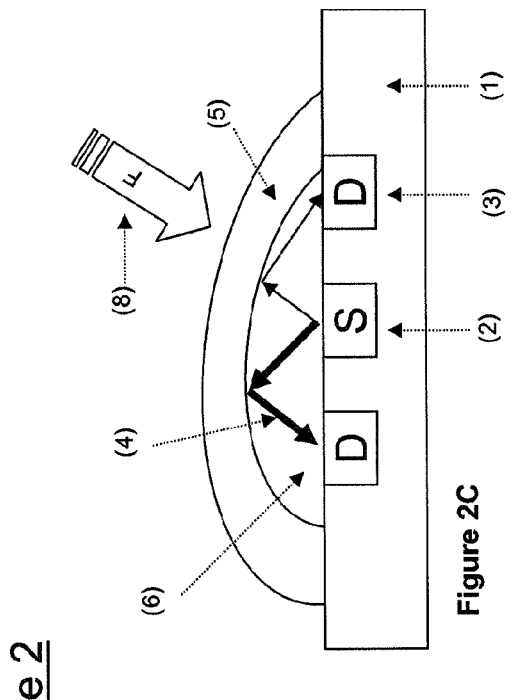
Side view
Figure 2A
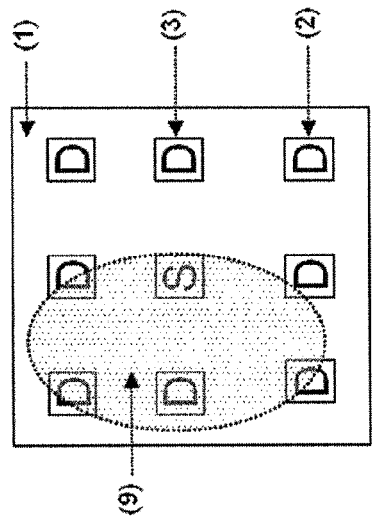
Figure 2C
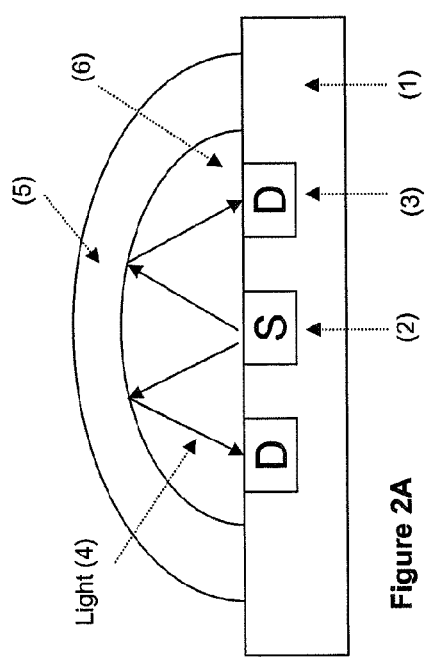
Top view
Figure 2B
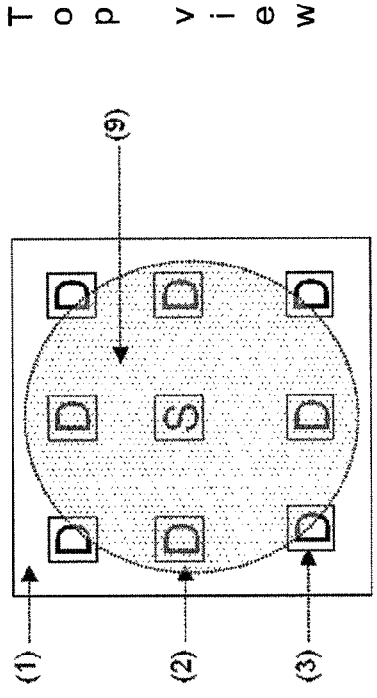
Figure 2D

Figure 3
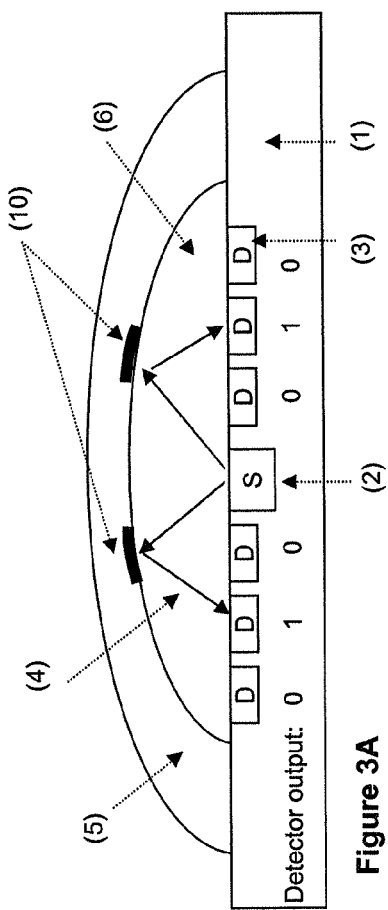
Figure 3A
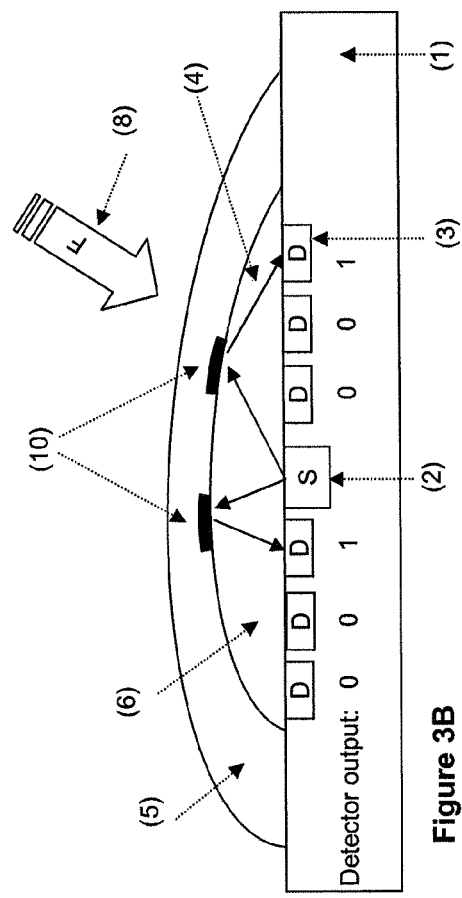
Figure 3B

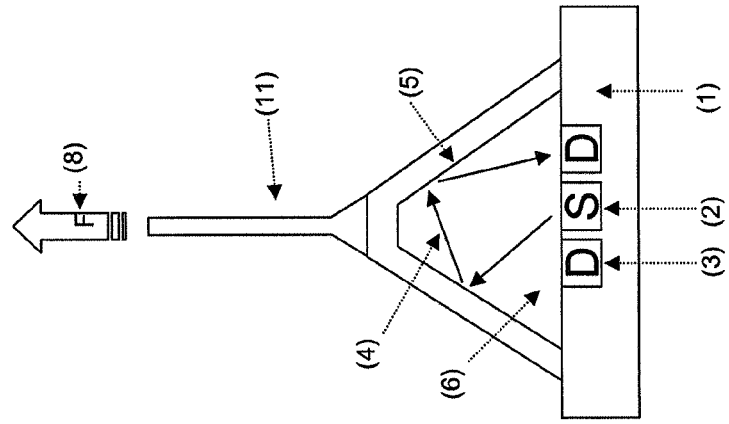
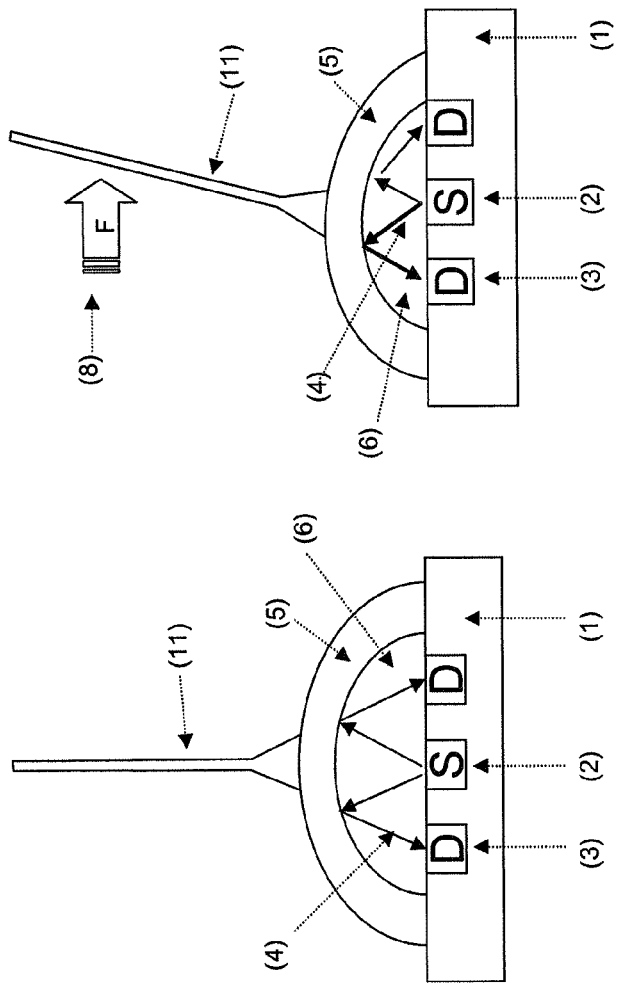

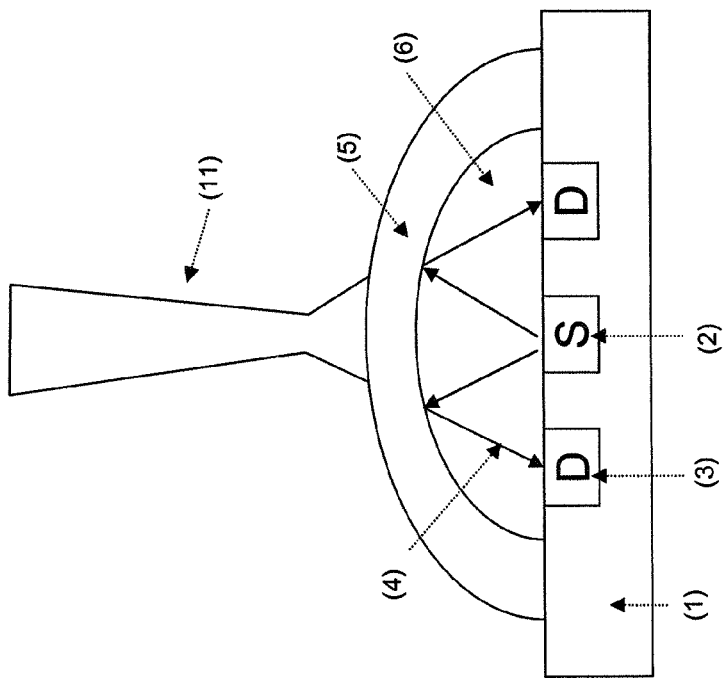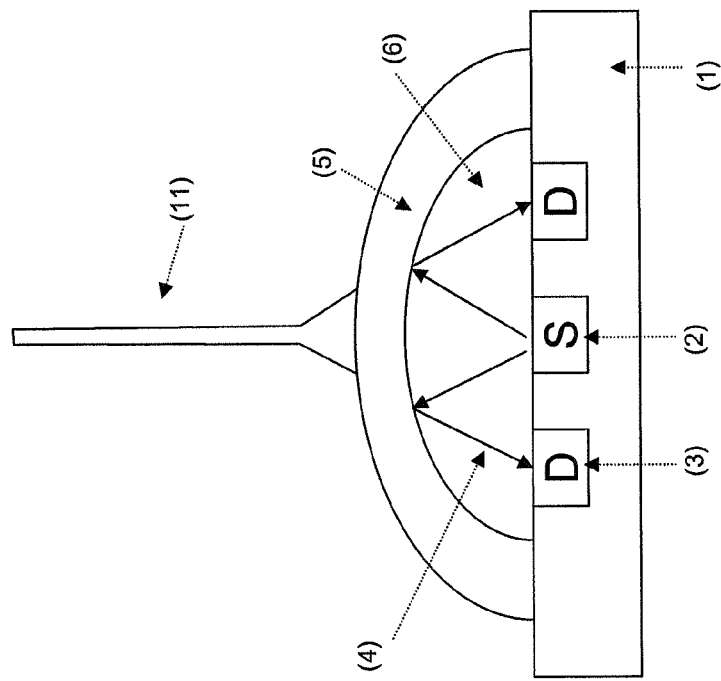
Figure 5

OPTICAL SENSOR FOR MEASURING A FORCE DISTRIBUTION

FIELD OF THE INVENTION

The invention relates to an optical sensor for measuring a force distribution over an area. The sensor can be applied e.g. as a robotic smart skin, a flow sensor or the sensoric part of a touch screen.

DESCRIPTION OF PRIOR ART

The present invention relates to the field of sensors for pressure or force recognition on a large area and with mechanical flexibility or even stretchability. This so-called 'electronic skin' has numerous applications. Perhaps the most appealing application is a pressure sensitive skin for future robots, but the sensor can be used in many fields like mechatronics, interactive game/computer interfaces and bio-medical industry. Examples of applications in the latter field are sensors to detect pressing feet of diabetics or to prevent bedsores.

Optical sensors for measuring pressure or force are not new. One example of such a sensor can be found in the publication 'An optical sensor for measuring forces applied to a body and items of clothing incorporating such sensors' (WO9913306). This sensor measures pressure or force by detecting a change of light depending on a deformation. The sensor is capable of measuring an (average) force over a certain area. A disadvantage of this sensor is that it comprises (at least) three individually manufactured devices (a light emitting device, a light receiving device and a passage from the light emitting device to the light receiving device) and therefore combining a plurality of these sensors to accurately measure a force distribution over a large area is not possible. In the publication 'A large-area, flexible pressure sensor matrix with organic field-effect transistors for artificial skin applications' Someya et al. describe a possible 'smart skin sensor' that works in an electro-mechanical way and comprises organic field-effect transistors integrated with rubber pressure sensors. The organic approach creates a flexible sensor that can measure a pressure distribution over a large (non-planar) area. However, the precision and resolution that can be obtained using electro-mechanical transistors is limited. Another disadvantage is that directional information cannot be obtained.

In one embodiment of the invention, the substrate, the light emitting sources and the light receiving detectors are part of an integrated organic layer. The sensors in the prior art publications EP1467224 'Optical proximity sensor' and GB2315594 'Sensing device comprising coplanar light emitter and detectors' comprise such a layer, but are only capable of detecting light reflecting objects in the proximity of the sensor, they cannot measure a pressure distribution.

Also based on an integrated organic layer is the touch screen described by Bürgi et al. in the publication 'Optical proximity and touch sensors based on monolithically integrated polymer photodiodes and polymer LEDs'. This touch screen is capable of detecting proximity and touch. However, it is not capable of measuring force distributions including directional information.

In one aspect the invention aims to provide a sensor capable of measuring a pressure distribution with high precision and resolution over a (not necessarily planar) area.

DISCLOSURE OF INVENTION

According to one aspect, the invention provides an optical sensor for measuring a force distribution, comprising a substrate; one or more light emitting sources and one or more receiving detectors provided on the substrate, the detectors responsive to the light emitted by the sources; wherein a deformable opto-mechanical layer is provided on said substrate with light responsive properties depending on a deformation of the opto-mechanical layer.

The design of the sensor and particularly the use of optical components in a deformable layer make it possible to measure the contact force accurately. The sensor is scalable and adaptable to complex shapes. In one embodiment, a direction of the contact force can be determined.

BRIEF DESCRIPTION OF THE DRAWINGS

FIGS. 1A-1C: First embodiment of the invention, wherein the opto-mechanical layer comprises optical cavities.

FIGS. 2A-2D: Alternative first embodiment of the invention wherein each optical cavity comprises one or more sources and one or more detectors to enable determination of direction of the forces.

FIGS. 3A-3B: Alternative first embodiment of the invention wherein a reflective pattern is provided on the walls of the optical cavities.

FIGS. 4A-4C: Alternative first embodiment of the invention wherein protrusions are provided on the opto-mechanical layer comprising optical cavities.

FIGS. 5A-5B: Alternative first embodiment of the invention wherein protrusions enable directional selectivity.

DETAILED DESCRIPTION

Figure 6:
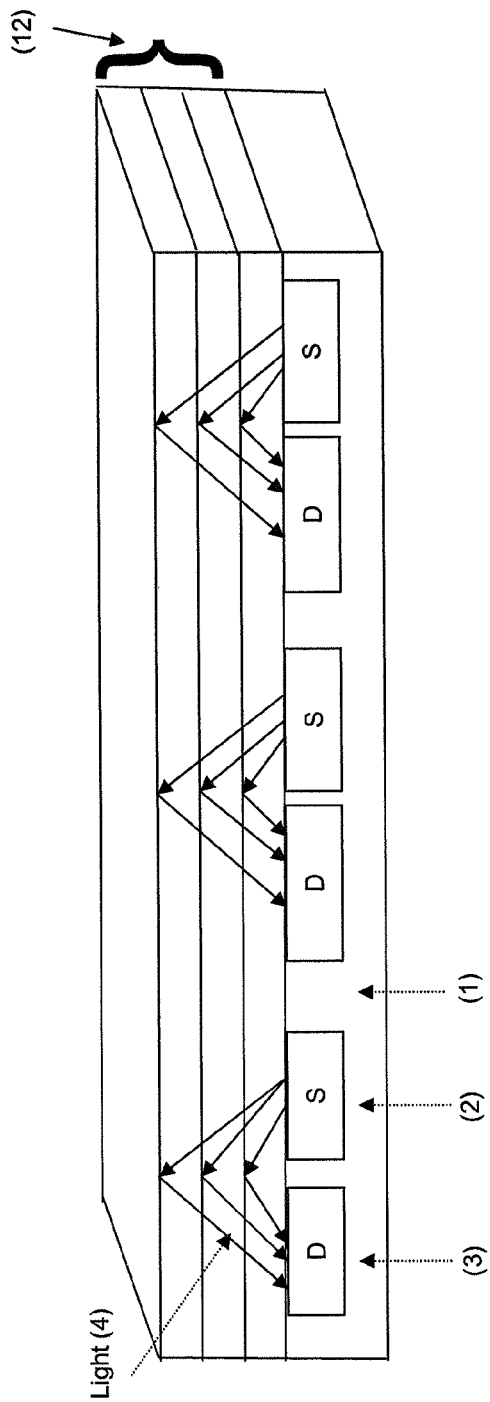
FIG. 6: Second embodiment of the invention wherein the opto-mechanical layer comprises a deformable Bragg reflector.

FIG. 1A shows an overview of the first embodiment of the invention: a substrate (1), comprising one or more light emitting sources (2) and one or more light receiving detectors (3) responsive to the light emitted by the sources (2) and a deformable opto-mechanical layer (5) provided on said substrate (1) with light responsive properties depending on a deformation of the opto-mechanical layer. The detectors are arranged to detect the light (4).

Details of the first embodiment can be found in FIG. IB. In this embodiment, the substrate (1), the sources 'S' (2) and the detectors 'D' (3) are part of an integrated organic layer. Suitable materials for the substrate are polyethylenes, such as polyethylene terephthalate (PET) and polyethylene naphthalate (PEN) or polyimides such as KAPTON® for example. The light emitting sources (2) can be e.g. organic light emitting diodes (OLED's) or polymer light emitting diodes (PLED's); the light receiving detectors (3) e.g. organic photo diodes (OPD's) or polymer photo diodes (PPD's).

The integrated organic layer can be manufactured in various ways. Printing is a cheap and relatively easy technique and in principle every pattern can be realized. The underlying substrate (1) can be a solid or can be a flexible foil. The advantages of a flexible (and potentially even stretchable) foil are that the sensor can adapt to complex shapes, is scalable in size, thin and light weight. Furthermore the integrated layer can be fabricated with known large-area micro solution based fabrication techniques in a cost-effective way. Another method of manufacturing the integrated organic layer is physical vapor deposition (PVD), which includes evaporative deposition and ion beam assisted deposition.

In the first embodiment, the opto-mechanical layer comprises optical cavities (6); each optical cavity (6) spanning one or more light emitting sources (2) and one or more light receiving detectors (3). The light responsive properties within an optical cavity (6) depend on the deformation of the optical cavity (6).

An optical cavity (6) does can be hollow or filled with air or other gasses. However filling an optical cavity (6) with a compressible material guiding the light is also a possibility.

In the first embodiment, the opto-mechanical layer is made of PDMS. Other rubber-like materials can also be used. Soft lithography with PDMS is a suitable manufacturing method for a deformable layer with optical cavities, with which structures even below micron-scales can be realized. PDMS is a transparent, rubber like material with abase of silicon. PDMS replicates a preformed surface very well.

Alternative manufacturing methods are micro injection molding or embossing. These methods can also be used with PDMS or other elastomers or thermoplasts.

In the first embodiment, the emitted light is reflected by a metal layer (7) provided on the walls of the cavities. However, it is not always necessary to provide the opto-mechanical layer with a responsive layer. If the opto-mechanical layer is made of a material with suitable responsive properties (e.g. refractive index/reflection properties), a responsive layer is not necessary.

A deformation caused by a force (8) exerted to the sensor changes the light responsive properties of the cavity (6). In FIG. 1C this is indicated by a different (i.e. greater) thickness of the arrows representing the light (4).

In the first embodiment, the responsive properties of the opto-mechanical layer are of a reflective nature. However, the response can be due to all properties that cause changes in the optical path, including at least reflection, transmission, dispersion, interference and absorption.

In the first embodiment, the sensor detects the difference between the reflection of the light in an undeformed state and the reflection of light during deformation. From this difference, the locally applied force (and its direction) will be determined. Relative measurements also prevent difficulties due to the expected variations in the sources (2) and detectors (3) originating from the manufacturing process or degradation processes. In an alternative first embodiment absolute measurement of the light (4) can be applied.

In the first embodiment, each cavity (6) spans only one light emitting source (2) and one light receiving detector (3). In this arrangement the direction of the force cannot be determined from the signal detected within one cavity (6). The direction of the force can only be determined using signals from a plurality of cavities (6).

FIG. 2 shows an alternative first embodiment of the sensor that allows the direction of the force to be detected within one cavity (6). As an example each cavity (6) comprises a pattern of one source (2) and eight surrounding detectors (3). In FIG. 2A en FIG. 2B, respectively showing the side view and top view of an undeformed cavity (6). No force is present and therefore a symmetrical light beam (9) will be detected. In FIG. 2C and FIG. 2D, respectively showing the side view and top view of a deformed cavity (6), it can be seen that a force (8) exerted on the cavity (6), results in an asymmetric light beam (9). It is contemplated that both the magnitude and the direction of the force (8) can be derived from this asymmetric light beam (9).

Because of the scattered nature of the light emitted by an organic LED, in the alternative first embodiment as described above, a continuous light intensity distribution (9) has to be sampled by the detector fields to determine the magnitude and direction of the force (8). This can be complex and expensive. A solution to avoid this problem is shown in FIG. 3. In this alternative first embodiment, instead of covering the whole wall of the cavities (6), only a pattern of the mirroring material (10) is applied. This pattern translates the continuous light distribution (9) into a segmented light pattern, resulting in a digital detector output. FIG. 3A shows the digital light pattern in the undeformed situation (010 010) and FIG. 3B shows the different pattern due to the deformation (001 001). This solution can reduce the complexity and the costs of the readout electronics.

In this embodiment the applied pattern of the reflective material (10) does not completely cover the walls of the cavity (6) and parts of the wall are not covered with the reflective material. Through the uncovered parts optical crosstalk is possible. Optical crosstalk occurs when light emitted within one cavity (6) influences the signal in other cavities. To prevent crosstalk, the non-reflective parts of the wall can be made light absorbing. In an alternative first embodiment, wherein the opto-mechanical layer comprises PDMS, carbon black can be used as an optical absorber, thus making the layer opaque. Coloring the opto-mechanical layer in this way hardly complicates the manufacturing process.

The pattern of reflective material to the walls of the cavities results in a digital detector output. Another possibility to achieve this is to focus the emitted light by providing lenses to the sources. With both printing and physical vapor deposition lenses can be manufactured relatively easy.

The light emitted by the sources (2) can comprise various wavelengths. In the first embodiment, every individual source (2) emits light comprising several wavelengths. In an alternative first embodiment the light originates from various sources (2), each of them emitting light of a single wavelength. When the emitted light comprises various wavelengths, light receiving detectors (3) must be responsive to these wavelengths. Every individual detector (3) can be responsive to the emitted wavelengths or various detectors (3) are present, each of them responsive to light of a single wavelength.

There can be several reasons why the light should comprise various wavelengths. In one embodiment, the invention is applied as an information display and the LEDs generating the light of the display simultaneously act as light emitting sources (2). This embodiment can e.g. be used in the field of interactive (game/computer) touch screen interfaces. In another embodiment, the opto-electronic layer is made of organic material, which tends to degrade during its lifetime. This degradation affects the characteristics of both sources (2) and detectors (3). Because the effects of degradation might differ for different wavelengths, the effects of degradation can be corrected for, using light comprising various wavelengths. In another embodiment, an internal reference is used for calibration. If the distributed detector and emitter elements are wavelength sensitive, several optical paths (and therefore measurement channels) can be superimposed without crosstalk and sensitivity could be increased.

In the first embodiment, the shape of the optical cavity (6) is like a circular dome. However, depending on the desired properties of the sensor in a particular application, the shape of the optical cavity (6) can be optimized in relation with the pattern of reflective material provided on the wall of the optical cavity (6) and the arrangement of light emitting sources (2) and light receiving detectors (3). Therefore, alternative first embodiments can comprise shapes other than circular and even non-symmetric shapes are possible.

The response of the sensor can be improved by adding protrusions (11) to the opto-mechanical layer. In an alternative first embodiment, the protrusions (11) are attached to the optical cavities in the opto-mechanical layer. This is shown in FIG. 4A. To obtain optimal results, each cavity (6) should be connected to one or more protrusions (11). The protrusions (11) cause various improvements.

The protrusions (11) provide more grip to the op to-mechanical surface.

The protrusions (11) enable measuring a force exerted near the opto-mechanical layer that does not touch the surface directly. This is shown in FIG. 4B.

FIG. 4C shows that protrusions (11) enable the sensor to detect a pulling force.

The protrusions (11) can be of various sizes and shapes. In some embodiments, the protrusions (11) are hair-like structures, in other embodiments protrusions (11) are more dimensional structures, resembling ridges or lamella.

By varying the size and/or shape of the protrusions (11), the sensitivity of the sensor to a force can be adjusted. To prevent the cavities deforming too much (or even collapse) or deforming too little to measure accurately, the size and/or shape of the protrusions (11) can be designed with respect to the force to be expected. A larger protrusion (11) will leverage the applied force and thus a small force can give a stronger response. On the opposite, the response to a large force can be diminished by a small protrusion (11).

By varying the size and/or shape of the protrusions (11), also the direction selectivity of the sensor can be adjusted. FIG. 5A and FIG. 5B show a front view and a side view of a protrusion (11) respectively, where the contacting surface of the protrusion (11) on the front is smaller than the surface on the side. This results in a greater sensitivity of the sensor to a force from the side.

The sensitivity and dynamic range of the sensor can also be adjusted by varying the material properties of the deformable opto-mechanical layer (5) (e.g. stiffness); a stiffer material will lead to a steeper force-deformation curve of the sensor.

To manufacture protrusions (11), soft lithography and micro injection molding can be used. These methods have been described earlier in relation to the manufacturing of the opto-mechanical layer. Embossing is another manufacturing method that is contemplated on.

Via the protrusions (11), a flow can be detected with minimal disturbance. Thus the invention can be used in a flow sensor or in an acoustic sensor. The protrusions (11) transfer the directional force exerted by the motion of the fluid, e.g. a liquid or gas to the cavities in the opto-mechanical layer.

In the first embodiment of the invention, the integrated organic layer and the opto-mechanical layer are manufactured separately. The opto-mechanical layer is laminated, e.g. by gluing to the op to-electrical layer or v.v. It is important that both foils are accurately positioned with respect to each other in order that corresponding electronic features in the subsequent foils accurately contact each other. It is also desirable that the manufacturing process can take place in a continuous production line so as to keep production costs at a moderate level.

It is expected that the importance of accurate alignment increases with a higher density of 'sensor-nodes'.

A second embodiment of the invention is presented in FIG. 6. In this embodiment the opto-mechanical layer comprises a deformable Bragg reflector (12). A Bragg reflector (12) has the characteristic that each wavelength of light has a certain reflectivity. It can e.g. be designed such that (almost) perfect response occurs for one particular wavelength.

A Bragg reflector is a structure formed by an alternating sequence of layers of different optical materials. The functioning is based on the principle of constructive interference and therefore the responsive properties depend on the thickness of the layers. Deformation of the Bragg reflector decreases the thickness of the layers and changes the characteristics of the reflector; the wavelengths will be reflected differently. A wavelength that was reflected (almost) perfectly will e.g. be reflected significantly less perfect. Another wavelength on the other hand could be reflected (almost) perfectly.

Light comprising several wavelengths is preferably used in combination with the Bragg reflector.

The present invention can be used as a smart skin. A smart skin is a sensor that can measure a contact force, potentially including direction with high precision and resolution over a large (non-planar) area. It can adapt to complex shapes, is scalable in size, thin and light weight. Furthermore it can be fabricated with known large-area micro fabrication techniques in a cost-effective way.

Another embodiment of the present invention is a touch screen potentially sensitive to a directional force. With the advantage that organic opto-electronic elements of the sensor can be fabricated in parallel with the pixel elements of an OLED display.

While the detailed drawings, specific examples and particular formulations given describe preferred and exemplary embodiments, they serve the purpose of illustration only. The inventions disclosed are not limited to the specific forms shown. For example, the way of measuring the responded light may differ. Instead of relative (difference) measurements, absolute measurements can be applied. The substrate preferably will be of a flexible nature but can also be a solid. The substrate may have many shapes and forms and dimensions including planar and non-planar ones. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

The invention claimed is:

1. An optical sensor for measuring a force distribution, comprising:
   an integrated, organic layer substrate including a plurality of organic light-emitting diodes (OLEDs) or polymer light-emitting diodes (PLEDs) as light-emitting sources and a plurality of organic photo diodes (OPDs) or polymer photo diodes (PPDs) as light-receiving detectors provided on the integrated, organic layer substrate, the detectors responsive to light emitted by the sources; and
   a deformable opto-mechanical layer provided on the integrated, organic layer substrate, the deformable opto-mechanical layer having light-responsive properties depending on a deformation of the opto-mechanical layer.

2. The optical sensor according to claim 1, wherein the light-emitting sources and light-receiving detectors are provided on the integrated, organic layer substrate by physical vapor deposition.

3. The optical sensor according to claim 1, wherein the light emitted by the light-emitting sources comprises several different wavelengths.

4. The optical sensor according to claim 1, wherein the opto-mechanical layer comprises a plurality of optical cavities; each optical cavity having walls and spanning one or more light-emitting sources and one or more light-receiving detectors; and each optical cavity having light-responsive properties depending on a deformation of the optical cavity.

5. The optical sensor according to claim 4, wherein at least part of the walls of the optical cavities are provided with a light-reflecting pattern and the light-receiving detectors are arranged to detect the pattern reflected.

6. The optical sensor according to claim 5, wherein the walls of the optical cavities further include non-reflective parts which possess light-absorbing properties.

7. The optical sensor according to claim 4, wherein the opto-mechanical layer further includes protrusions attached thereto and each of the plurality of optical cavities are connected to one or more protrusions; the protrusions adjusted in size and shape to transfer a directional force to a cavity deformation.

8. A flow sensor comprising an optical sensor according to claim 7, wherein the protrusions are located on a surface of the sensor such that the protrusions can be contacted with a fluid to transfer movement of the fluid to the opto-mechanical layer.

9. An acoustic sensor comprising the fluid sensor according to claim 8.

10. The optical sensor according to claim 1, wherein the light-emitting sources are provided with lenses to focus the light emitted and the light-receiving detectors are arranged to detect the light focused by the lenses.

11. The optical sensor according to claim 1, wherein the opto-mechanical layer comprises polydimethylsiloxane (PDMS).

12. The optical sensor according to claim 1, wherein the opto-mechanical layer comprises a deformable Bragg reflector.

13. The optical sensor according to claim 1, wherein the integrated, organic layer substrate comprises polyethylenes or polyimides.

14. An optical sensor for measuring a force distribution, comprising:
    an integrated, organic layer substrate including a plurality of organic light-emitting diodes (OLEDs) or polymer light-emitting diodes (PLEDs) as light-emitting sources and a plurality of organic photo diodes (OPDs) or polymer photo diodes (PPDs) as light-receiving detectors provided on the integrated, organic layer substrate, the detectors responsive to light emitted by the sources;
    a deformable opto-mechanical layer provided on the integrated, organic layer substrate, the deformable opto-mechanical layer having light-responsive properties depending on a deformation of the opto-mechanical layer; and
    a plurality of optical cavities within the opto-mechanical layer, each optical cavity having walls and spanning one or more or more of the light-emitting sources and one or more of the light-receiving detectors; and each optical cavity having light-responsive properties depending on a deformation of the optical cavity.

* * * * *